(12) United States Patent
Edge et al.

(10) Patent No.: US 9,344,991 B2
(45) Date of Patent: May 17, 2016

(54) METHODS AND SYSTEMS FOR RESPONDING TO HANDOVER EVENTS DURING POSITIONING SESSIONS

(71) Applicant: QUALCOMM Incorporated, San Diego, CA (US)

(72) Inventors: Stephen William Edge, Escondido, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/791,812

(22) Filed: Mar. 8, 2013

(65) Prior Publication Data

US 2014/0256323 A1    Sep. 11, 2014

(51) Int. Cl.
*H04W 36/00* (2009.01)
*H04W 64/00* (2009.01)
*H04W 36/14* (2009.01)

(52) U.S. Cl.
CPC .............. *H04W 64/00* (2013.01); *H04W 36/14* (2013.01)

(58) Field of Classification Search
CPC ... H04W 64/00; H04W 64/003; H04W 12/02; H04W 12/08; H04W 64/006; H04W 76/048; H04W 4/02

USPC .................... 455/436, 456.2, 456.1, 443, 438
See application file for complete search history.

(56) References Cited

U.S. PATENT DOCUMENTS

| | | |
|---|---|---|
| 7,181,218 B2 | 2/2007 | Ovesjo et al. |
| 7,200,401 B1 | 4/2007 | Hulkkonen et al. |
| 2006/0073831 A1 | 4/2006 | Guyot et al. |
| 2011/0009130 A1* | 1/2011 | Wu .............................. 455/456.1 |
| 2013/0012232 A1 | 1/2013 | Titus et al. |

FOREIGN PATENT DOCUMENTS

WO      2011112849 A1     9/2011
WO  WO 2012112104 A1 *  8/2012  .......... H04W 64/006

* cited by examiner

*Primary Examiner* — David Q Nguyen
(74) *Attorney, Agent, or Firm* — Berkeley Law & Technology Group, LLP

(57) ABSTRACT

Disclosed are systems, methods and devices for responding to changes in a wireless access type occurring in connection with a handover event affecting a mobile terminal while the mobile terminal is engaged in a position determination session with a location server. If a first positioning protocol employed in the position determination session is not supported or enabled by the changed wireless access type, the position determination session may be resumed or restarted using a second positioning protocol supported or enabled by the changed wireless access type.

26 Claims, 8 Drawing Sheets

METHODS AND SYSTEMS FOR RESPONDING TO HANDOVER EVENTS DURING POSITIONING SESSIONS

BRIEF DESCRIPTION

1. Field

Embodiments described herein are directed to positioning sessions for a mobile device that is in communication with a location server.

2. Information

Mobile devices, such as mobile phones, notebooks, computers, etc., typically have the ability to estimate location and/or position with a high degree of precision using any one of several technologies such as, for example, satellite positioning systems (SPSs) (e.g., GPS and the like), advanced forward trilateration (AFLT), observed difference of time of arrival (OTDOA), just to name a few examples. Such estimation of location for a mobile device can be useful or even essential for many applications including, for example, applications that provide navigation directions to the user of a mobile device, applications that keep track of the location of a child, animal or valuable asset and applications associated with locating the user for an emergency services call. Location or position estimation techniques typically involve the processing of measurements which are based on signals acquired at a mobile device receiver. For example, a mobile device may acquire SPS signals transmitted from a space vehicle or a pilot signals transmitted from a terrestrial base station. Various measured characteristics of the acquired signals such as phase, signal strength, time of arrival and round trip delay may be used for computing a pseudorange measurement for use in computing a position fix. In order to position a mobile device, a positioning session may be established between the mobile device and some location server that may be attached to or part of a home network or a serving network for the mobile device. The positioning session may: (i) enable the location server to assist the mobile device to make measurements of suitable radio signals such as SPS signals or signals from network base stations; (ii) enable the mobile device to transfer location measurements to the location server for computation of a location estimate for the mobile device; and/or (iii) enable the location server to provide assistance data (AD) to the mobile device to enable the mobile device to compute a location estimates from location measurements previously obtained. The positioning session may continue for some significant period of time in some cases (e.g., 5.0 to 60.0 seconds) during which time the mobile device may handover from a first access network to a second access network in response to changes in radio conditions (e.g. fading or interference) or changes in the position of the mobile device (e.g. caused by a user walking from one room in a building into another).

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
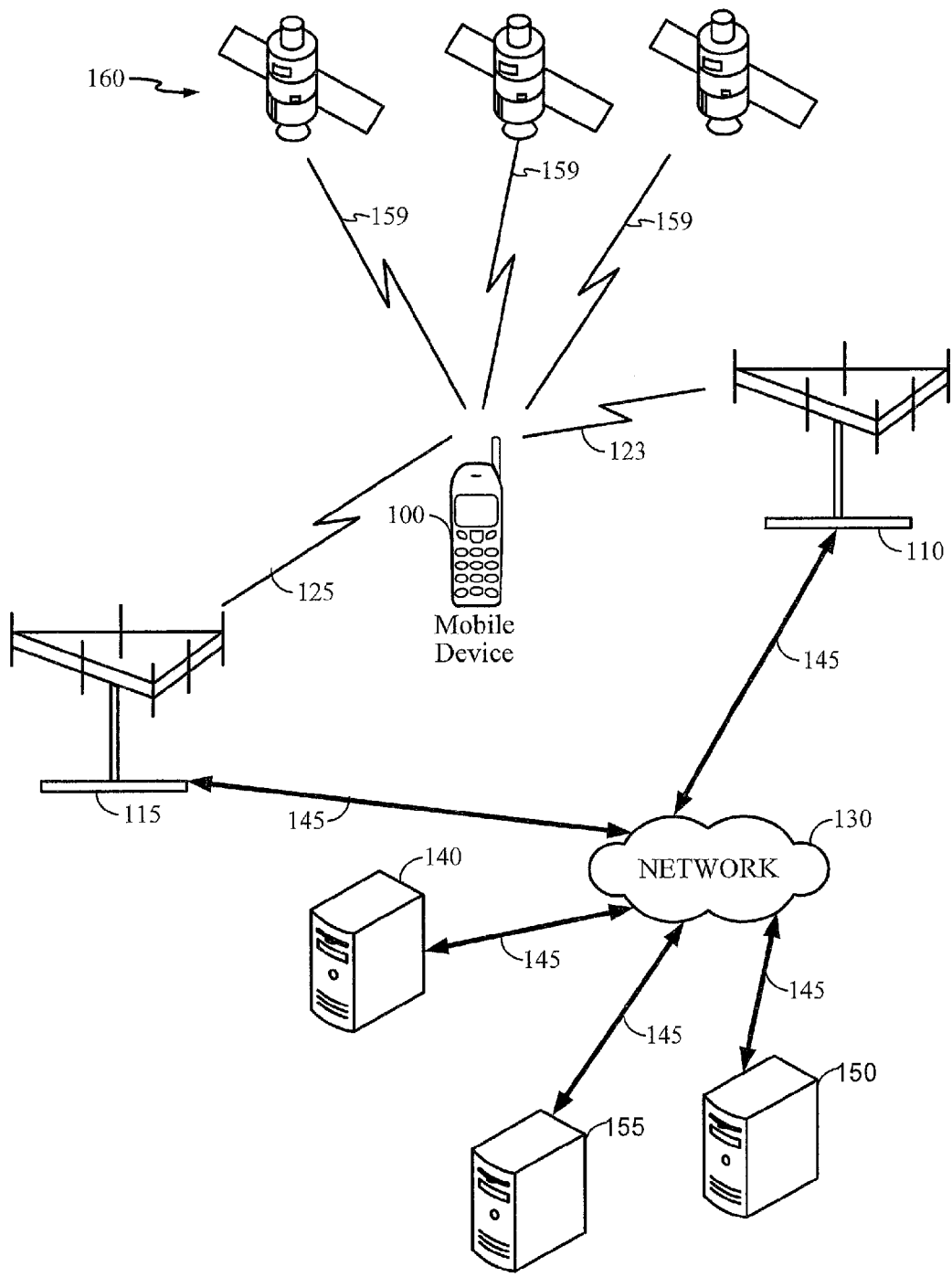
FIG. 1 is a system diagram illustrating certain features of a system containing a mobile device, in accordance with an implementation.

Briefly, particular implementations are directed to method of position determination for a terminal comprising: detecting a handover of the terminal from receiving service through a first wireless access type to receiving service through a second wireless access type while said terminal is in a position determination session with a location server according to a first positioning protocol, wherein the second wireless access type is different from the first wireless access type; and in response to detecting the handover, initiating a transition to application of a second positioning protocol instead of said first positioning protocol, wherein the second positioning protocol is enabled or supported by the second wireless access type.

Another particular implementation is directed to a mobile terminal comprising: a transceiver to transmit messages to and receive messages from a wireless communication network; and a processor to: detect a handover of the mobile terminal from receiving service at said transceiver through a first wireless access type to receiving service through a second wireless access type while said mobile terminal is in a position determination session with a location server according to a first positioning protocol, wherein the second wireless access type is different from the first wireless access type; and in response to detecting the handover, initiating a transition to application of a second positioning protocol instead of said first positioning protocol, wherein the second positioning protocol is enabled or supported by the second wireless access type.

Another particular implementation is directed to an article comprising: a storage medium comprising machine-readable instructions stored thereon which are executable by a special purpose computing apparatus at a mobile terminal to: detect a handover of the mobile terminal from receiving service through a first wireless access type to receiving service through a second wireless access type while said terminal is in a position determination session with a location server according to a first positioning protocol, wherein the second wireless access type is different from the first wireless access type; and in response to detecting the handover, initiating a transition to application of a second positioning protocol instead of said first positioning protocol, wherein the second positioning protocol is enabled or supported by the second wireless access type.

Another particular implementation is directed to an apparatus comprising: means for detecting a handover of the terminal from receiving service through a first wireless access type to receiving service through a second wireless access type while said terminal is in a position determination session with a location server according to a first positioning protocol, wherein the second wireless access type is different from the first wireless access type; an means for initiating a transition to application of a second positioning protocol instead of said first positioning protocol in response to detecting the handover, wherein the second positioning protocol is enabled or supported by the second wireless access type.

It should be understood that the aforementioned implementations are merely example implementations, and that claimed subject matter is not necessarily limited to any particular aspect of these example implementations.

DETAILED DESCRIPTION

Mobile devices typically receive communications services (e.g. to enable establishment of voice and data sessions between users) from wireless networks such as networks employing radio technologies that may include Code Division Multiple Access 2000 (cdma2000), High Rate Packet Data (HRPD), Global System for Mobile Communications (GSM), Enhanced Data rates for GSM Evolution (EDGE), Wideband Code Division Multiple Access (WCDMA), Long-Term Evolution (LTE) and various Wireless Local Area Network (WLAN) technologies such as IEEE 802.11. GSM, EDGE, WCDMA and LTE are radio technologies defined by an organization known as the 3rd Generation Partnership Project (3GPP). Cdma2000 and HRPD are radio technologies defined by an organization known as the 3rd Generation Partnership Project 2 (3GPP2).

Certain positioning techniques or positioning methods that employ acquisition of signals from terrestrial transmitters may be enabled or supported by particular wireless access technologies or wireless access types of the type mentioned above. The support of these positioning methods may be defined by one or more positioning protocols that define the operation of and interaction between a mobile terminal that is being positioned and a location server that is assisting and directing the positioning. Examples of existing standardized positioning protocols include the Radio Resource Location Services (LCS) Protocol (RRLP), the Radio Resource Control (RRC) protocol, the LTE Positioning Protocol (LPP) and the IS-801 protocol. RRLP, RRC and LPP are defined by 3GPP in publicly available documents whereas IS-801 is defined by 3GPP2 in publicly available documents. The OTDOA positioning method is defined in LPP and may be enabled or supported if a mobile terminal is currently receiving service from a network providing an LTE wireless access type but may not be enabled or supported if the mobile terminal is currently receiving service from a network providing a cdma2000 or HRPD wireless access type. Similarly, the AFLT positioning method is defined in IS-801 and may be enabled or allowed if a mobile terminal is currently receiving service from a cdma2000 or HRPD network but may not be enabled or allowed if the mobile terminal is currently receiving service from an LTE, WCDMA or GSM network. A handover event at a mobile device initiating a change from a first wireless access type to a second wireless access type may be disruptive to uncompleted attempts to obtain a position fix using a particular positioning method or positioning protocol if the particular positioning method or positioning protocol is not enabled or supported by the second wireless access type. For example, a handover from LTE to HRPD may be disruptive to a process attempting to obtain a position using OTDOA and LPP. Likewise, a handover from HRPD to LTE may be disruptive to a process attempting to obtain a position using AFLT and IS-801. The disruption may occur for one of several different reasons. One reason may be that after handover to the second access type, the mobile terminal may be unable to make measurements of signals transmitted by the first access type because (i) these signals are no longer detectable, (ii) the signals are no longer of sufficient strength to make accurate measurements or (iii) the mobile terminal is unable to temporarily retune to the first access type and make any measurements. Another reason may be that when using the second access type, the mobile terminal is implemented to use a different positioning protocol and/or different positioning methods suitable for the second access type which do not support or include, respectively, the positioning method and positioning measurements required for the first access type.

In one particular implementation that may resolve the problems described previously, a handover event transitioning a mobile terminal from receiving service from a network providing a first wireless access type to receiving service from a network providing a second wireless access type may occur during a position determination session between the mobile terminal and a location server while a first positioning protocol is being used. If the first positioning protocol is not enabled or supported by the second wireless access type, the mobile terminal may be transitioned to apply a second positioning protocol that is supported or enabled by the second wireless access type. The positioning determination session between the location server and the mobile terminal may then be restarted or resumed.

A mobile terminal may be referred to as a mobile device, a device, a terminal, a mobile station, a user equipment (UE), a SET and may correspond to a cellular telephone, a laptop, a tablet, a smart phone or some other computing device attached to or containing a wireless modem capable of supporting such radio access technologies as GSM, EDGE, WCDMA, LTE, cdma2000, HRPD, WLAN, just to provide a few examples. In some embodiments, a mobile terminal may support fixed access types such as Ethernet or packet cable. A location estimate for a mobile terminal may be referred to as a location, a position or a position estimate.

In certain implementations, as shown in FIG. 1, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one of several regional navigation satellite systems (RNSS) such as, for example, Wide Area Augmentation System (WAAS), European Geostationary Navigation Overlay Service (EGNOS), Quasi-Zenith Satellite System (QZSS), just to name a few examples. One positioning method that is typically used to support positioning using measurements of SPS satellites is known as Assisted GNSS (A-GNSS) and is supported in different forms by the RRLP, RRC, LPP and IS-801 positioning protocols.

In addition, mobile device 100 may transmit radio signals to, and receive radio signals from, a wireless communication network. In one example, mobile device 100 may communicate with a cellular communication network by transmitting wireless signals to, or receiving wireless signals from, base station transceiver 110 over wireless communication link 123 or base station transceiver 115 over wireless communication link 125. Base station transceivers 110 and 115 may support GSM, WCDMA, LTE, cdma2000, HRPD, WLAN or some other radio technology.

In a particular implementation, base station transceivers 110 and 115 may communicate with servers 140, 150 and/or 155 over a network 130 through links 145. Here, network 130 may comprise any combination of wired or wireless links and may be a network that is providing wireless communication services to mobile device 100 (e.g. establishment and release of voice and data sessions to other devices). In a particular implementation, network 130 may comprise Internet Protocol (IP) infrastructure capable of facilitating communication between mobile device 100 and servers 140, 150 or 155 through base station transceivers 110 and 115. In another implementation, network 130 may comprise cellular communication network infrastructure such as, for example, base station controllers or master switching centers (not shown) to facilitate mobile cellular communication with mobile device 100. In some implementations, servers 140, 150 and 155 may be connected to other networks not shown in FIG. 1 that can be accessed from network 130 (e.g., via IP infrastructure).

In particular implementations, and as discussed below, mobile device 100 may have circuitry and processing resources capable of making positioning related measurements of base station transceivers 110 and 115 and/or of SPS satellites 160 and in some cases also capable of computing a position fix or estimated location of mobile device 100 from these measurements. For example, mobile device 100 may compute a position fix based, at least in part, on pseudorange measurements to four or more SPS satellites 160. Here, mobile device 100 may obtain such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler and code phase search windows, just to name a few examples.

In other implementations, mobile device 100 may obtain a position fix by measuring signals received from terrestrial transmitters fixed at known locations (e.g., such as base station transceivers 110 or 115) using any one of several position methods such as, for example, advanced forward trilateration (AFLT) and/or observed time difference of arrival (OTDOA). In these particular techniques, mobile device 100 may measure the timing or phase difference between pairs of transmitters from a set of three or more of such terrestrial transmitters fixed at known locations based, at least in part, on pilot signals or reference signals (e.g. positioning reference signals) transmitted by the transmitters fixed at known locations and received at mobile device 100. Here, servers 140, 150 or 155 may be capable of providing positioning assistance data to mobile device 100 including, for example, expected timing, expected timing differences and/or identities for terrestrial transmitters and in some cases locations of terrestrial transmitters to facilitate positioning techniques such as AFLT and OTDOA. For example, servers 140, 150 or 155 may include a base station almanac (BSA) which indicates locations and identities of cellular base stations in a particular region or regions. In some embodiments, only one server may communicate with and assist mobile device 100 even though other servers may be available.

In addition, servers 140, 150 or 155 may provide (or may comprise) a location server that is capable of interacting with mobile device 100 in the course of a position determination session initiated by mobile device 100 or the location server. For example, mobile device 100 and the location server may implement one or more aspects of User Plane (UP) positioning such as the SUPL (Secure User Plane Location) location solution as set forth in publicly available documents from the Open Mobile Alliance (OMA). With such a location solution, for example, position estimates obtained or enabled at mobile device 100 may be made available to other entities such as, for example, applications in other servers accessible to servers 140, 150, 155 that provide location related services to mobile device 100 or the user of mobile device 100 (e.g., provision of navigation directions) or that provide services related to the location of mobile device 100 to other clients (e.g., to support finding and tracking of the user of mobile device 100 or a valuable asset to which mobile device 100 is attached). Making these position estimates available to other entities may be useful in other applications such as, for example, providing emergency services. Here, a "position determination session" may be established between a SUPL location platform (SLP) (e.g., location server such as servers 140, 150 or 155) and a SUPL Enabled Terminal (SET) (e.g., mobile device 100) for determining an estimated location of the SET. As discussed below, a position determination session may be initiated by either a SET or an SLP. It should be understood that this is merely one example of how a position determination session may be established, and claimed subject matter is not limited in this respect. In a particular implementation, such a SET may comprise a mobile device (e.g., mobile device 100) employing any one of the aforementioned technologies for estimating its location, and forward to an SLP either the estimated location (in a SET based mode) or measurements allowing the estimated location to be obtained by the SLP (in a SET assisted mode) as part of a positioning session.

SUPL version 2.0 (e.g., as set forth in the UserPlane Location Protocol (ULP) Draft Version 2.0.1—15 Nov, 2012) supports several positioning protocols comprising RRLP (which may be supported or enabled by LTE, WCDMA and GSM wireless access types), LPP (which may be supported or enabled by an LTE wireless access type), IS-801 (which may be supported or enabled by cdma2000 and HRPD) and RRC (which may be supported or enabled by WCDMA), just to provide a few particular non-limiting examples of positioning protocols that may be supported. Each of these positioning protocols may be carried within the SUPL ULP protocol. Thus, a SUPL positioning session between a SET and an SLP may commence with the exchange of one or more SUPL ULP messages after which one or more position methods may be instigated by the SLP or SET through the transfer of messages defined for a particular positioning protocol (e.g., one of RRLP, RRC, LPP or IS-801) that are each carried within a SUPL message. The positioning protocol messages may be used to request assistance data (AD) by the SET from the SLP, provide or return assistance data from the SLP to the SET, request particular measurements by the SLP from the SET and provide or return positioning measurements or a position estimate from the SET to the SLP. The positioning protocol messages may also be used to exchange the positioning capabilities of the SET and SLP. The AD, request for measurements and actual measurements or position estimate that are transferred may all be specific to a particular position method such as A-GNSS, OTDOA or AFLT or may apply to several position methods. The positioning protocol being used may restrict the choice of position methods (to those defined by the positioning protocol) and the current wireless access network for the SET may further restrict the usable position methods. Use of any of the above positioning protocols may be restricted to (1) a subset of wireless access types and (2) a set of positioning methods enabled or supported by these access types. A SET may support multiples of these positioning protocols allowed by SUPL 2.0 for any particular wireless access type presently being employed, or may only support some (e.g., just one) of the positioning protocols for a particular wireless access type presently being employed. A SET may not then be able to continue using a first positioning protocol on a first access type if the SET undergoes handover to a second access type for which the first positioning protocol is not allowed by SUPL or is not supported or enabled by the second access type. Furthermore, even if the SET attempts to continue using the first positioning protocol (e.g., by making use of position methods defined in the first positioning protocol for the first access type), the SET may not be able to make measurements for the first access type after handover to the second access type (e.g., because the SET is unable to tune back to the first access type for long enough to make measurements), thereby preventing accurate location of the SET using the first positioning protocol.

In a particular implementation, base station transceivers 110 and 115 may provide mobile device 100 with different "wireless access types" employing, for example, different air interfaces and/or communication protocols to provide cellular service to mobile device 100. If mobile device 100 has a capability to receive service with the different wireless access types available through base stations transceivers 110 and 115, mobile device 100 may transition between receiving service according to the two different wireless access types in a "handover" procedure. In a particular example implementation, a location of mobile device 100 may physically move from a coverage cell of base station transceiver 110 receiving service according to a first wireless access type toward a coverage area of base station transceiver 115. Mobile device 100 may acquire a pilot signal or other signal transmitted by base station transceiver 115 to initiate the handover event. In another example implementation, mobile device 100 may not move at all but radio interference or fading phenomena for reception of signals from base station transceiver 110 may force handover of mobile device 100 to base station transceiver 115 in order to continue receiving adequate radio coverage for service.

In one example implementation, for the purpose of illustration, base station transceiver 110 may provide service according to the wireless access type LTE while base station transceiver 115 may provide access according to the wireless access type HRPD and not LTE. If the aforementioned handover event occurs while mobile device 100 is in a position determination session attempting to obtain a position fix using OTDOA, this position determination session may be disrupted or compromised since OTDOA may not be enabled or supported by the HRPD service provided by base station transceiver 115.

In one scenario, during a SUPL 2.0 positioning session, a SET may be handed off from receiving service from a network providing a first access type to receiving service from a network providing a second access type while the SET is engaged in a positioning session with a SLP according to a particular positioning protocol that is both allowed by SUPL and supported by the SLP and SET for the first wireless access type. If the particular positioning protocol is not allowed by SUPL or not supported by the SET for the second wireless access type, a positioning result for the position determination session may be compromised. In this case, the positioning session could fail (e.g., if the SET is not able to return a position estimate or position measurements). Alternatively, the session may end with some position estimate that is less accurate than that possible using a new positioning session and new positioning protocol enabled or supported by the new wireless access type. For example, if the first access type at a SET is LTE and positioning was requested by the SLP using LPP for A-GNSS and OTDOA and handover then occurs to HRPD as the second access type, it is possible that the SET may still return A-GNSS results to the SLP using LPP but the SET may not be able to return OTDOA results since OTDOA would not be supported by HRPD. However, if a new positioning session using IS-801 were to be invoked by the SLP, the SET may return location results for both A-GNSS and AFLT leading to a better location estimate. However, since the SLP may not be immediately aware that handover had occurred, it may not invoke such a second positioning session. It may therefore be useful to enable a change in a positioning protocol in response to a handover event during a positioning session.

Figure 2:
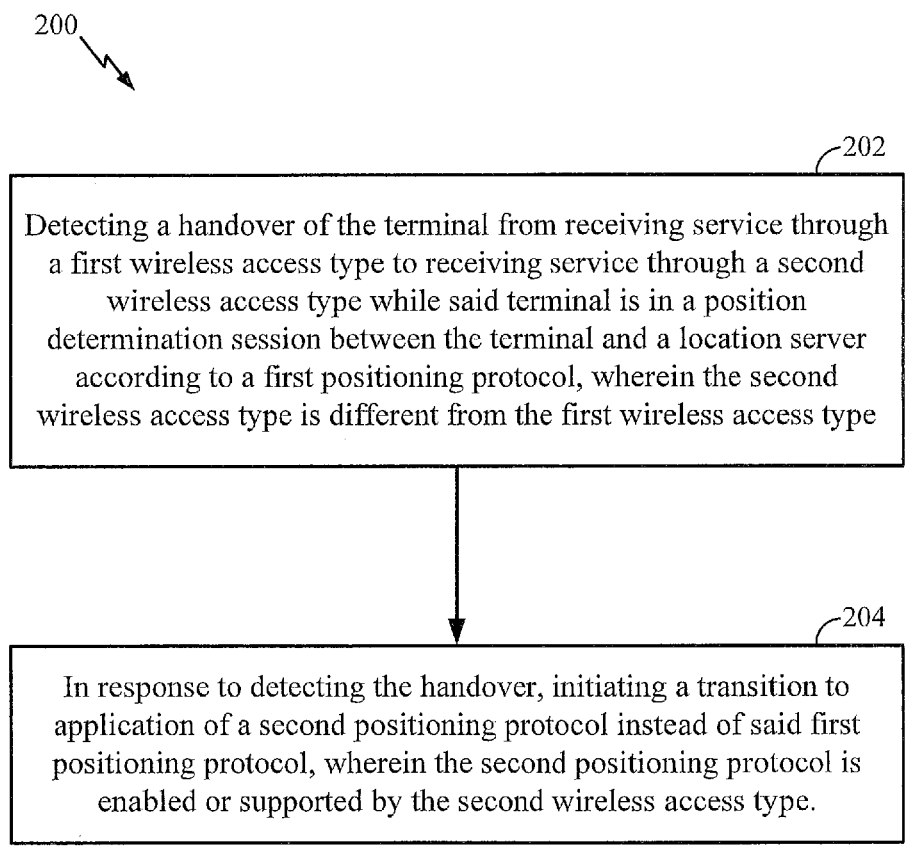
FIG. 2 is a flow diagram of a process to respond to a handover event during a position determination session according to an embodiment.

FIG. 2 is a flow diagram of a sample process at a mobile device or mobile terminal (e.g., a SET) for responding to a handover event while a position determination session is in progress. At block 202, a position determination session between a location server and a mobile terminal may be in progress. As discussed below, the mobile terminal may comprise a SET while the location server may comprise an SLP. The position determination session may employ a first positioning protocol that is enabled or supported by a first wireless access type. For example, the position determination session may employ a positioning protocol such as RRLP while the mobile terminal is receiving service from a GSM or WCDMA network characterizing a particular wireless access type. Similarly, the position determination session may employ LPP as a positioning protocol while the mobile terminal is receiving service from an LTE network characterizing another particular wireless access type.

As discussed above, while a mobile terminal is engaged in a position determination session using a particular positioning protocol a handover event may occur, for example, as the mobile terminal transitions from receiving service from first a base station using a first wireless access type to receiving service from a second base station according to a second wireless access type. Block 202 detects a handover of a terminal to a second wireless access type different from the first wireless access type. As pointed out above, if the second wireless access type does not enable or support the particular positioning protocol being used in the position determination session, the handover event may disrupt the current position determination session initiated at block 202. At block 204, a mobile terminal may be transitioned to application of a second positioning protocol that is enabled or supported by the second wireless access type. The position determination session in progress at block 202 may resume or be restarted based on application of the second positioning protocol.

Figure 3:
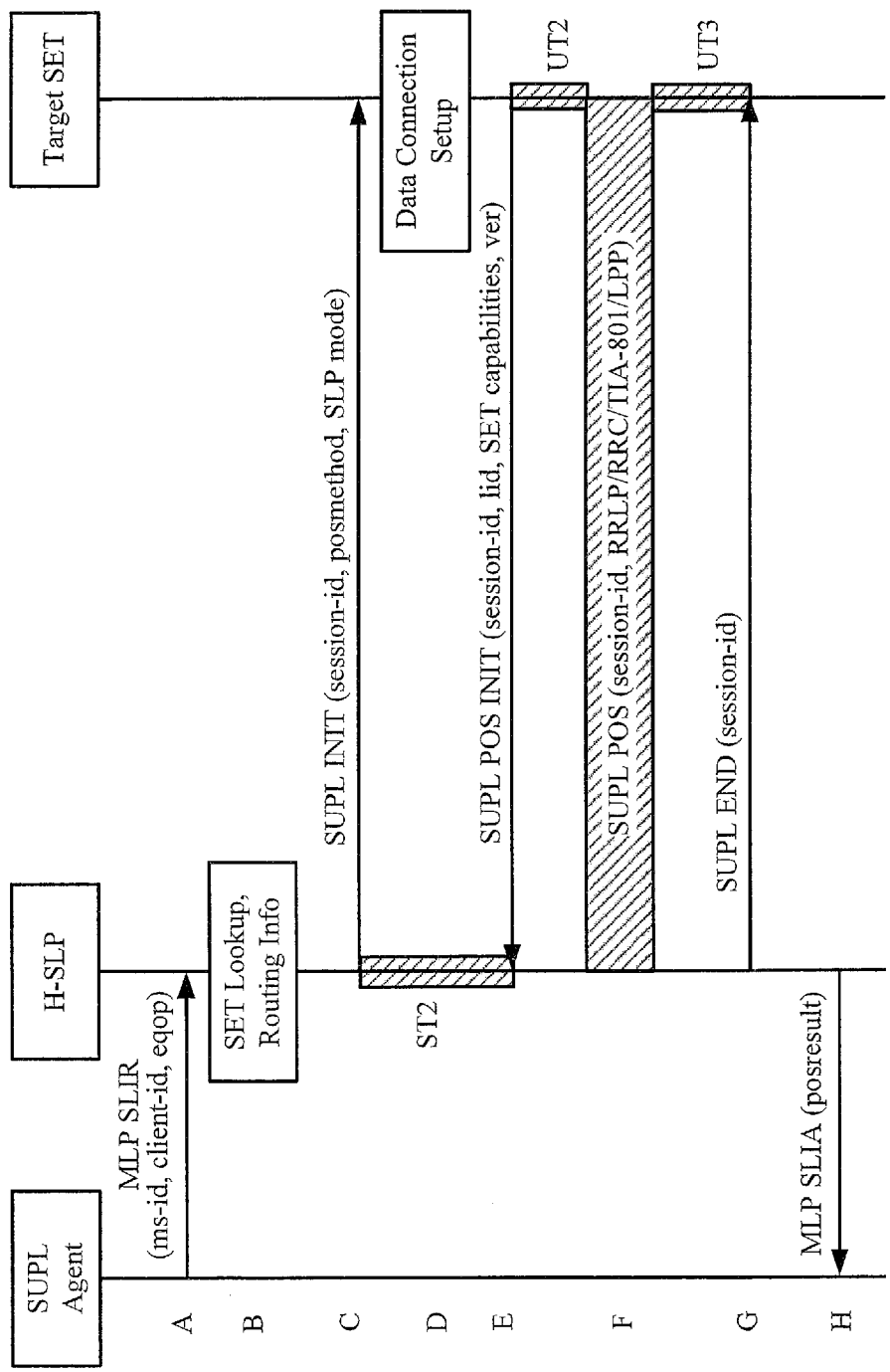
FIG. 3 is a message flow diagram illustrating a network initiated position determination session according to an embodiment.
Figure 4:
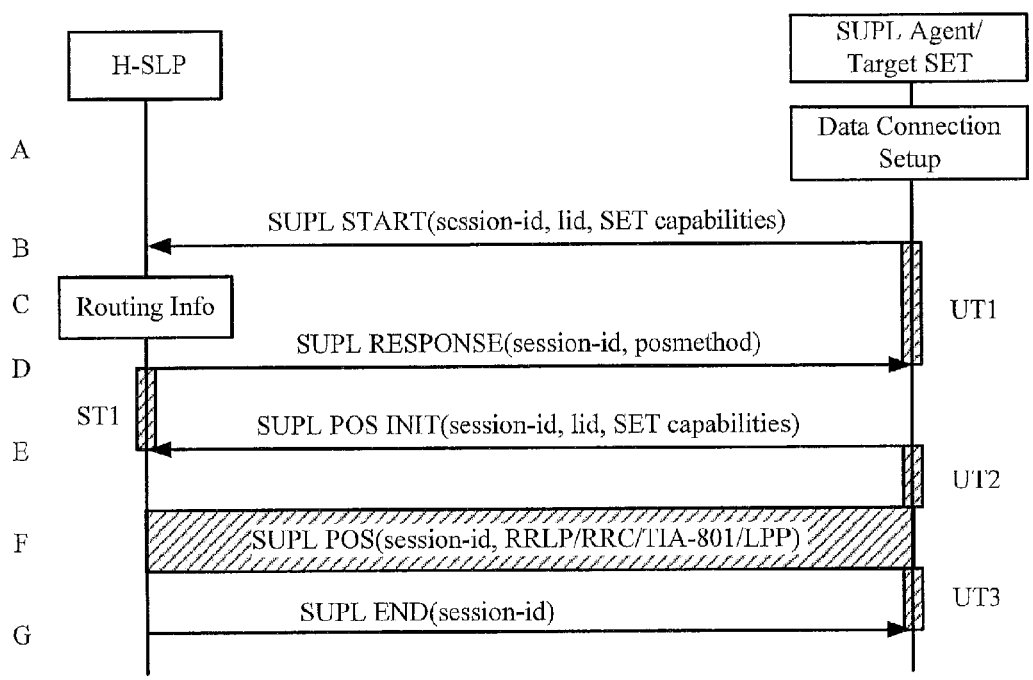
FIG. 4 is a message flow diagram illustrating a SET initiated position determination session according to an embodiment.

FIGS. 3 and 4 are message flow diagrams illustrating events in connection with a SUPL position determination session established between a SET and a SLP according to embodiments. FIG. 3 is directed to a particular implementation in which a position determination session is network initiated. At event A, an external client that may be referred to as a SUPL Agent may send a request to a Home SLP (H-SLP) for a particular SET to request a current location estimate for the SET. At event B, the H-SLP may verify information for the SET and the external client (e.g., may determine that the SUPL Agent is authorized to locate the SET). At event C, the H-SLP may begin a SUPL session with the SET by forwarding a SUPL INIT message to the SET (e.g., using Short Message Service (SMS) or User Datagram Protocol (UDP) over IP to transport the SUPL INIT) specifying a session identifier and an intended positioning method. At event D, the SET may establish a secure IP connection to the H-SLP and at event E, the SET may respond with a SUPL POS INIT message (which may be transmitted over the secure IP connection established at event D) specifying its capabilities to perform positioning operations (e.g., particular positioning protocols supported based, at least in part, on a current wireless access type) and containing some initial position related data (e.g., current serving cell identification and type of current access network). A position determination session may be performed at event F based, at least in part, on SET capabilities provided in the SUPL POS INIT message. In the position determination session, the H-SLP and SET may exchange SUPL POS messages with each SUP POS message containing one (or in some embodiments more than one) positioning protocol message (e.g., a message according to the RRLP, RRC, LPP or IS-801 positioning protocol). The particular positioning protocol used at event F may have been identified by the SET as a supported positioning protocol at event E and may be a protocol supported or enabled for the type of access network the SET is using as indicated to the H-SLP at event E. The positioning protocol messages may convey assistance data and a request for measurements or a location estimate from the H-SLP to the SET and may convey a request for assistance data and/or positioning measurements or a position estimate from the SET to the H-SLP. At completion of the position determination session at event F which may occur after the H-SLP has obtained a location estimate for the SET, the H-SLP may forward a SUPL END message to the SET at event G to terminate the SUPL session. The H-SLP may then return the location estimate obtained during event F back to the SUPL Agent at step H.

FIG. 4 is directed to a particular implementation in which a position determination session is initiated by a SET using the SUPL location solution in order to obtain its location (e.g. on behalf of the user of the SET or a program or application running on the SET that needs the SET location). Here, at event A, the SET establishes a secure IP connection to its H-SLP. At event B, the SET transmits a SUPL START message to the H-SLP (using the secure IP connection established at event A) specifying a session identifier and its capabilities to perform positioning operations including the positioning protocols supported by the SET. At event C, the H-SLP may verify the SET subscription for receiving SUPL location services and at event D, the H-SLP may return a SUPL RESPONSE message indicating an intended position method and a readiness to continue the session. The SET may then transmit a subsequent SUPL POS INIT message at event E containing some initial position related data (e.g. current serving cell identification and type of current access network) and again indicating its positioning capabilities including positioning protocols supported. A position determination session may then follow at event F during which the H-SLP and the SET exchange SUPL POS messages each carrying one (or possibly more than one) positioning protocol message (e.g., a message according to RRLP, RRC, LPP or IS-801). The positioning protocol used may be one of those indicated as supported by the SET at events B and E and may also be a protocol that is supported or enabled by the access network type indicated as used by the SET at event E. The positioning protocol messages that are exchanged may convey assistance data and/or a request for measurements or a location estimate from the H-SLP to the SET and may convey a request for assistance data and/or positioning measurements or a position estimate from the SET to the H-SLP. The position determination session at event F may be completed once the SET has obtained its location estimate or sufficient assistance data to enable it to determine its location at a later time. At completion of the position determination session at event F, the H-SLP may forward a SUPL END message to the SET at event G to terminate the SUPL session.

In the particular examples illustrated above in FIGS. 3 and 4, a handover event may occur during a position determination session at event F in each example in which a SET may transition to receiving service from a network providing a different wireless access type initiated by the handover event. As discussed above, if a positioning protocol employed in the positioning session is not supported or enabled by the different wireless access type, the handover event may disrupt the position determination session. FIGS. 5 through 10 are example message flow diagrams illustrating alternative implementations of a process for responding to a handover event while a position determination session is in progress (e.g., at event F as shown in the particular embodiments of FIGS. 3 and 4). As shown in FIGS. 5 through 10, a handover event occurs at an event B during a SUPL position session for an event A in which SUPL POS messages are exchanged between a SET and SLP containing positioning protocol messages according to a particular positioning protocol such as RRLP, RRC, TIA-801 or LLP. It should be understood, however, that these are merely examples of a positioning protocol and claimed subject matter is not limited in this respect. The event A in FIGS. 5 through 10 may correspond to event F in FIGS. 3 and 4 in the case that handover occurs during a network or SET initiated SUPL session to obtain the SET's location. The event A in FIGS. 5 through 10 may instead correspond to a position determination session for other types of SUPL session defined for SUPL by OMA (e.g. a session established to obtain multiple periodic or triggered location estimates for a SET). Events subsequent to event B in FIGS. 5 through 10 show how the original SUPL session (e.g. the SUPL session of FIG. 3 or FIG. 4) may be modified as a consequence of the handover at event B to enable positioning of the SET to continue with reduced or no impairment. Furthermore, while the modified sequence of events in FIGS. 5 through 10 are shown and described as applying to a SUPL session between a SET and an H-SLP, they may be applied to a SUPL session between a SET and another type of SLP such as a visited SLP (V-SLP), discovered SLP (D-SLP) or emergency SLP (E-SLP).

Figure 5:
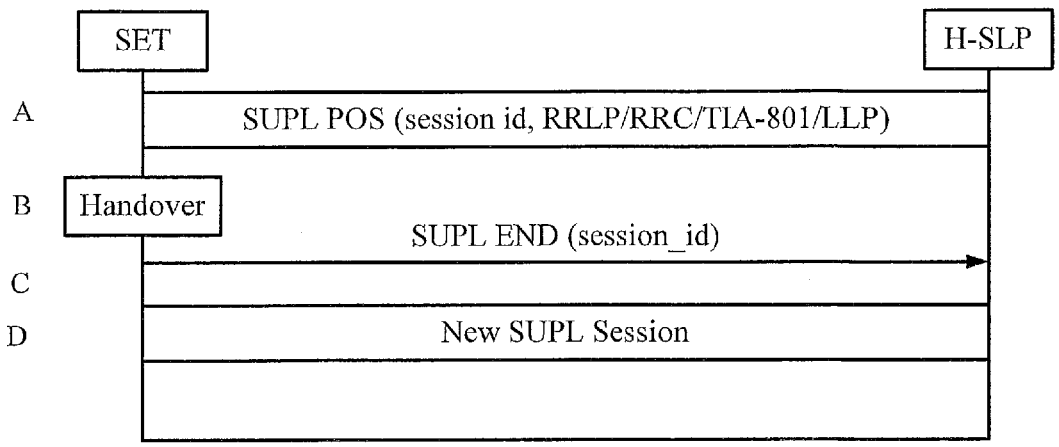
FIGS. 5 through 10 are message flow diagrams of alternative processes for responding to a handover event during a position determination session according to alternative embodiments.

In the particular alternative implementation of FIG. 5, the SET transmits a SUPL END message at event C in response to detection of the handover event at event B. The SUPL END message may be sent after the handover is completed and may indicate that a current positioning protocol is not enabled by the new wireless access type or is not supported by the SET for the new wireless access type. The SUPL END may terminate the current SUPL session. A new SUPL positioning session may then be initiated by the SET or H-SLP at event D. The new SUPL session may be similar to or the same as the previous SUPL session terminated at event C. For example, if the previous SUPL session was according to FIG. 3, then the H-SLP may initiate the new SUPL session according to FIG. 3. If the previous SUPL session was according to FIG. 4, then the SET may initiate the new SUPL session according to FIG. 4. The new SUPL positioning session may employ a new positioning protocol that is enabled or supported by the new wireless access type following the handover event.

Figure 6:
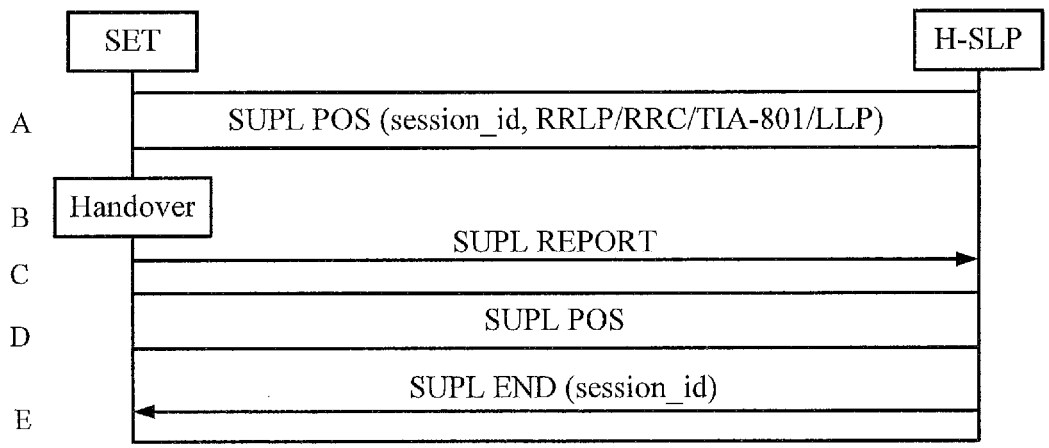

In the particular alternative implementation of FIG. 6, a SET transmits a SUPL REPORT message at event C in response to detection of the handover event B and possibly following completion of the handover. The SUPL REPORT may convey the SET capabilities (e.g., positioning protocols available to and supported by the SET based on the new wireless access type following the handover event) and may also convey a SUPL Location ID or Multiple Location IDs parameter indicating the new wireless access type. The H-SLP may then abort use of a current positioning protocol and change to application of a new positioning protocol supported or enabled by the new wireless access type. The position determination session of event A may then continue at event D via the exchange of further SUPL POS messages between the H-SLP and SET. However, the SUPL POS messages exchanged may now carry positioning protocol messages for a different positioning protocol than the one used at event A that is enabled by the new wireless access type and is indicated as supported by the SET at event C. The SUPL session may later terminate normally (e.g. after the H-SLP or SET has obtained a location estimate for the SET) by the transmission of a SUPL END message from the H-SLP to the SET at event E.

Figure 7:
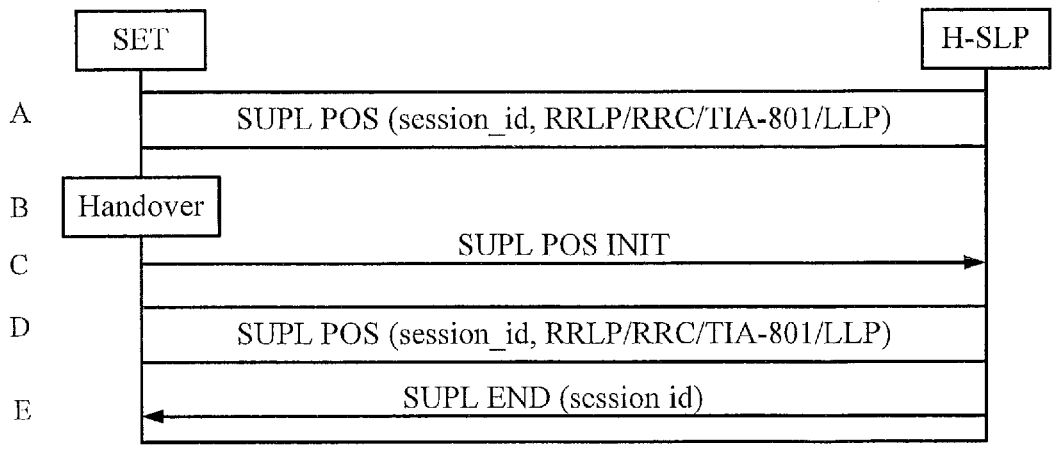
Figure 8:
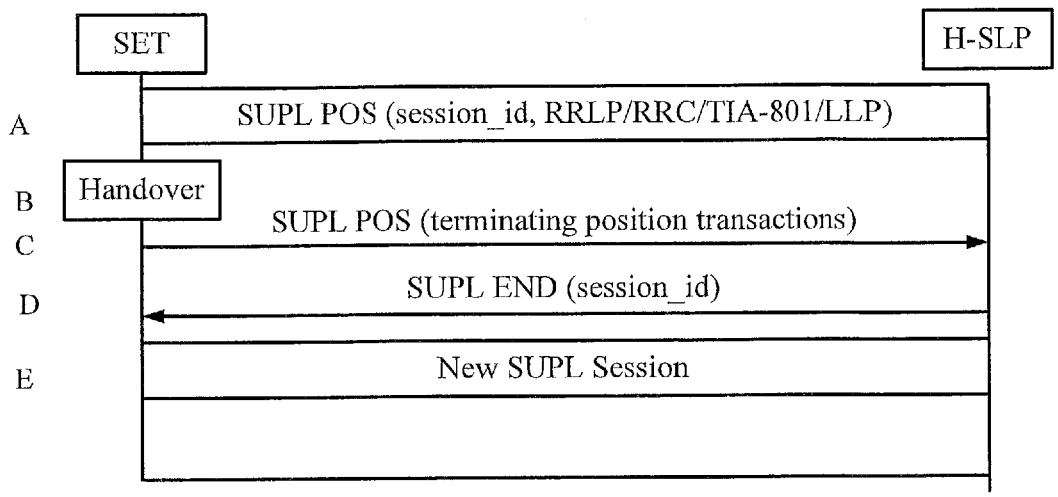

FIG. 7 is directed to an alternative to the implementation of FIG. 6 in which a SET transmits a SUPL POS INIT message instead of a SUPL REPORT message at event C with new SET capabilities following the handover event and a Location ID or Multiple Location IDs parameter indicating the new wireless access type. FIG. 7 may in other respects operate the same as in FIG. 6.

In another alternative implementation, instead of immediately terminating a position determination session in response to detection of a handover to a new wireless access type that does not support or enable a current positioning protocol, a SET may continue attempting positioning operations in a current position determination session to the extent possible or feasible. In this alternative, the SET and H-SLP may continue to exchange SUPL POS messages containing positioning protocol messages according to the same positioning protocol being used prior to the handover event. If continuing positioning operations is not feasible, as shown in the particular implementation of FIG. 8, in response to a handover event at event B, a SET may transmit one or more than one SUPL POS message(s) at event C to terminate all ongoing positioning transactions in a current position determination session. Continuing attempting positioning operations may not be feasible in some embodiments if the SET is unable to continue making positioning measurements after handover to the new wireless access type. For example, if the SET was initially accessing an LTE wireless network and had been instructed by the H-SLP to perform OTDOA measurements of LTE eNode B base stations according to the LPP positioning protocol and was then handed over to an HRPD access network, the SET may be unable to tune back to the LTE network to make OTDOA measurements. Because LPP is not enabled for an HRPD access network, the SET may also be unable to return measurements to the H-SLP using LPP for the HRPD access network and may therefore be unable to continue the previous position determination session. Depending on a particular positioning protocol being applied in the current position determination session, such a SUPL POS message may convey a positioning protocol error or abort indication such as by conveying an LPP Abort or RRLP Error message, for example, in the case that the initial positioning protocol was LPP or RRLP, respectively. In response to the error or abort indication in event C, the H-SLP may then terminate the SUPL session by sending a SUPL END message at event D. If desired, a new SUPL session applying a positioning protocol enabled or supported by the new wireless access type may then be initiated by the H-SLP or SET at event E as described above for event D in FIG. 5.

Figure 9:
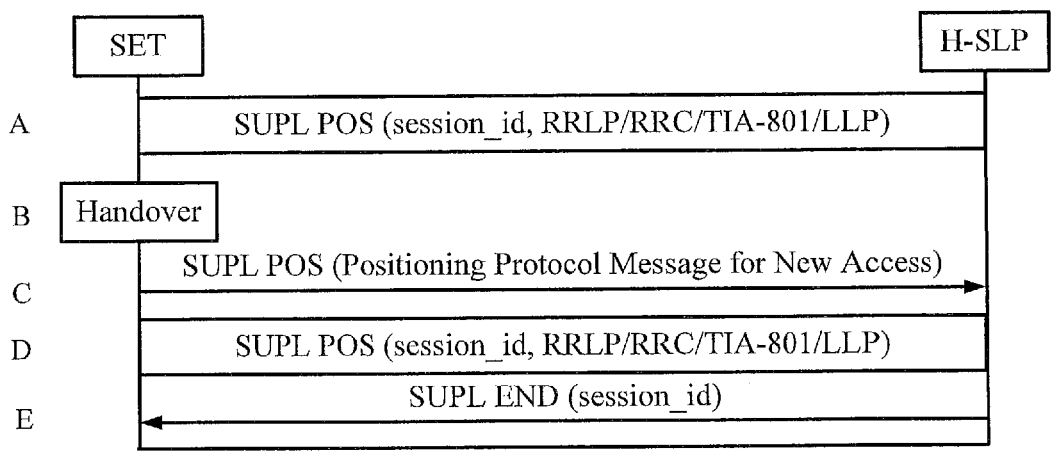

In the particular alternative implementation of FIG. 9, in response to the handover event B, a SET may transmit a SUPL POS message at event C conveying one or more positioning protocol messages according to a positioning protocol that is enabled for the new wireless access type and supported by the SET. If the new positioning protocol for event C is LPP, for example, such a SUPL POS message may comprise an LPP Provide Capabilities message or an LPP Provide Location Information message or an LPP Request Assistance Data message. Observing the change in positioning protocol at event C, the SLP may then abort use of the previous positioning protocol used at event A and commence applying the new positioning protocol in a continuation of the position determination session at event D. The SUPL session may later terminate normally with the H-SLP sending a SUPL END at event E.

Figure 10:
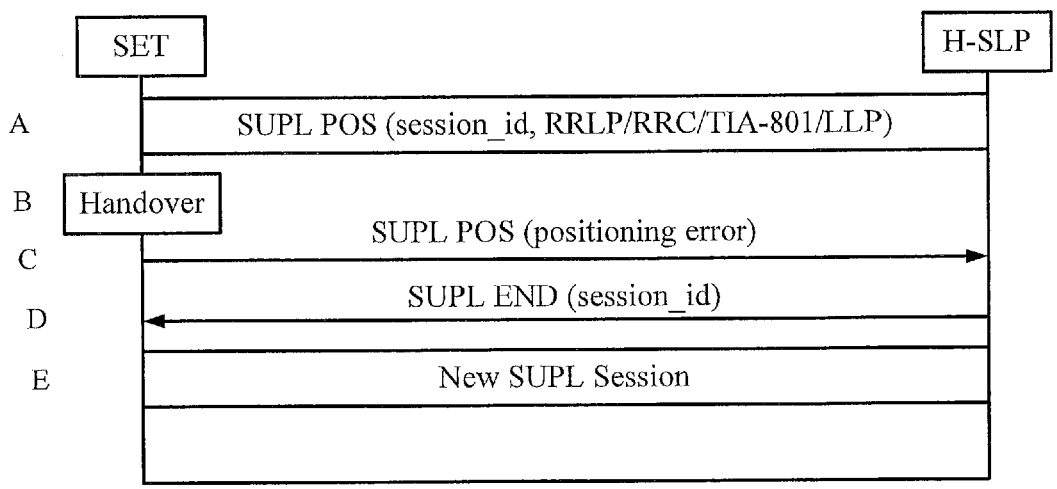

In the particular alternative implementation of FIG. 10, in response to the handover event B, the SET may continue application of a current positioning protocol applied in a current position determination session to the extent possible. If positioning operations using the current positioning protocol cannot reasonably continue, the SET may return a SUPL POS (positioning error) message to the H-SLP at an event C to indicate that the current positioning protocol is not supported. If the initial positioning protocol is RRLP, for example, the SUPL POS (positioning error) message may convey an RRLP Error message that includes an error cause indicating that handover has occurred and/or that the current positioning protocol (RRLP) can no longer be used. If the initial positioning protocol is LLP, for example, the SUPL POS (positioning error) message may convey an LPP Provide Location message that contains a location error reason indicating that handover has occurred and/or that the current positioning protocol (LPP) can no longer be used. In the particular illustrated embodiment, the current SUPL session may be terminated by the H-SLP sending a SUPL END at event D and restarted at event E as discussed for event D in FIG. 5. Alternatively, the H-SLP may change the positioning protocol to one that is supported or enabled, but not terminate the current SUPL session and instead continue the position determination session using the new positioning protocol (not shown in FIG. 10).

Figure 11:
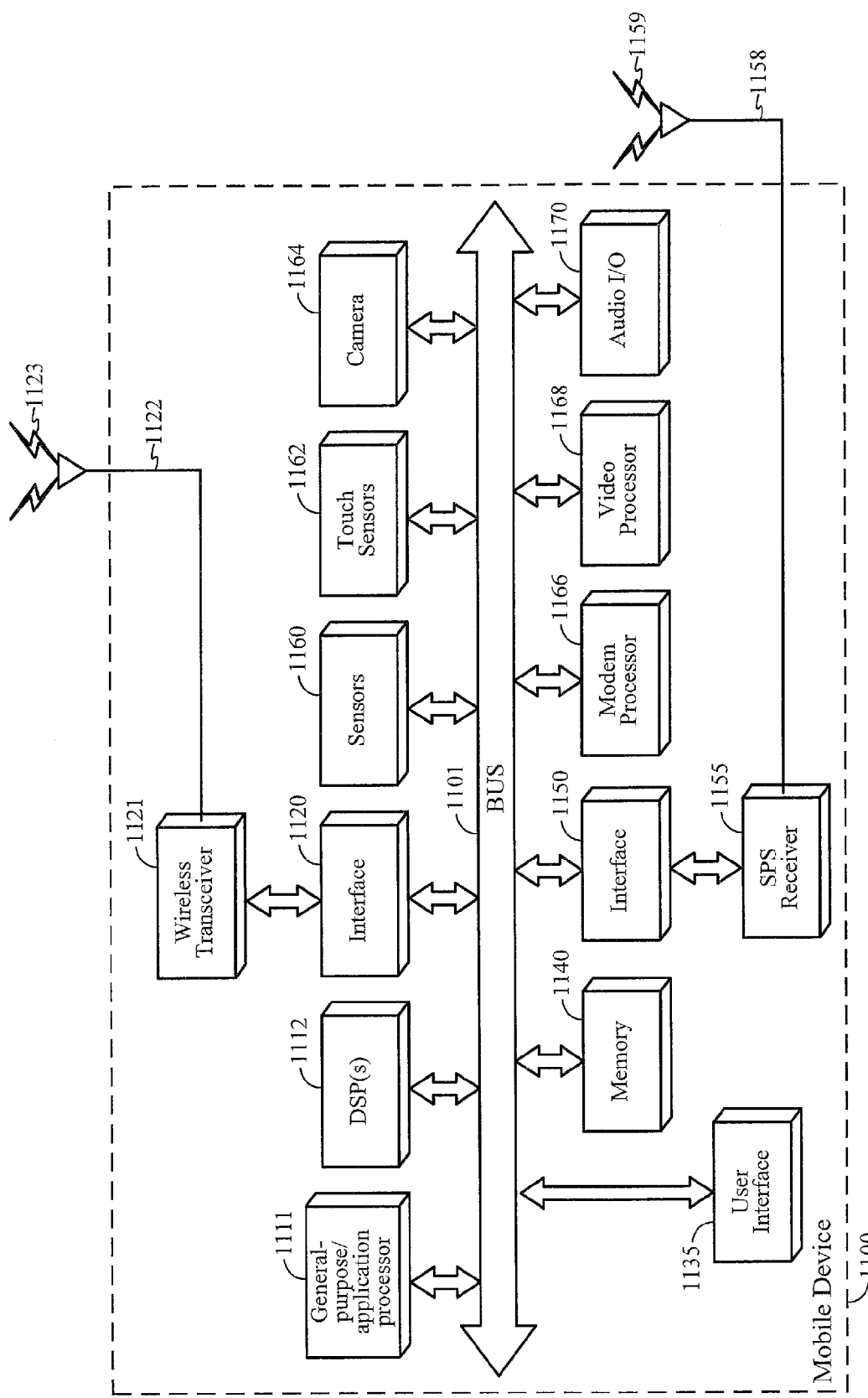
FIG. 11 is a schematic block diagram illustrating an exemplary mobile device, in accordance with an implementation.

FIG. 11 is a schematic diagram of a mobile device according to an embodiment. Mobile device 100 (FIG. 1) may comprise one or more features of mobile device 1100 shown in FIG. 11. In addition, mobile device 1100 may be configured to operate as a SET as described above. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, cdma2000, HRPD, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 11, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 11, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose processor/application processor 1111 in support of one or more applications such as, for example, applications directed to positioning or navigation operations.

In a particular implementation, a digital map of an indoor area may be stored in a particular format in memory 1140. The digital map may have been obtained from messages containing navigation assistance data from a remote server. General purpose/application processor 1111 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area. In one implementation, a mobile device may further apply crowed sourced data (e.g., obtained from a location server) to confirm an inferences of an egress segment. For example, if there is a history of mobile devices moving through a feature presumed to be an egress segment, the feature may be confirmed as providing an egress segment.

In a particular implementation, mobile device 1100 may comprise a dedicated modem processor 1166 capable of performing baseband processing of signals received and down-converted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 12:
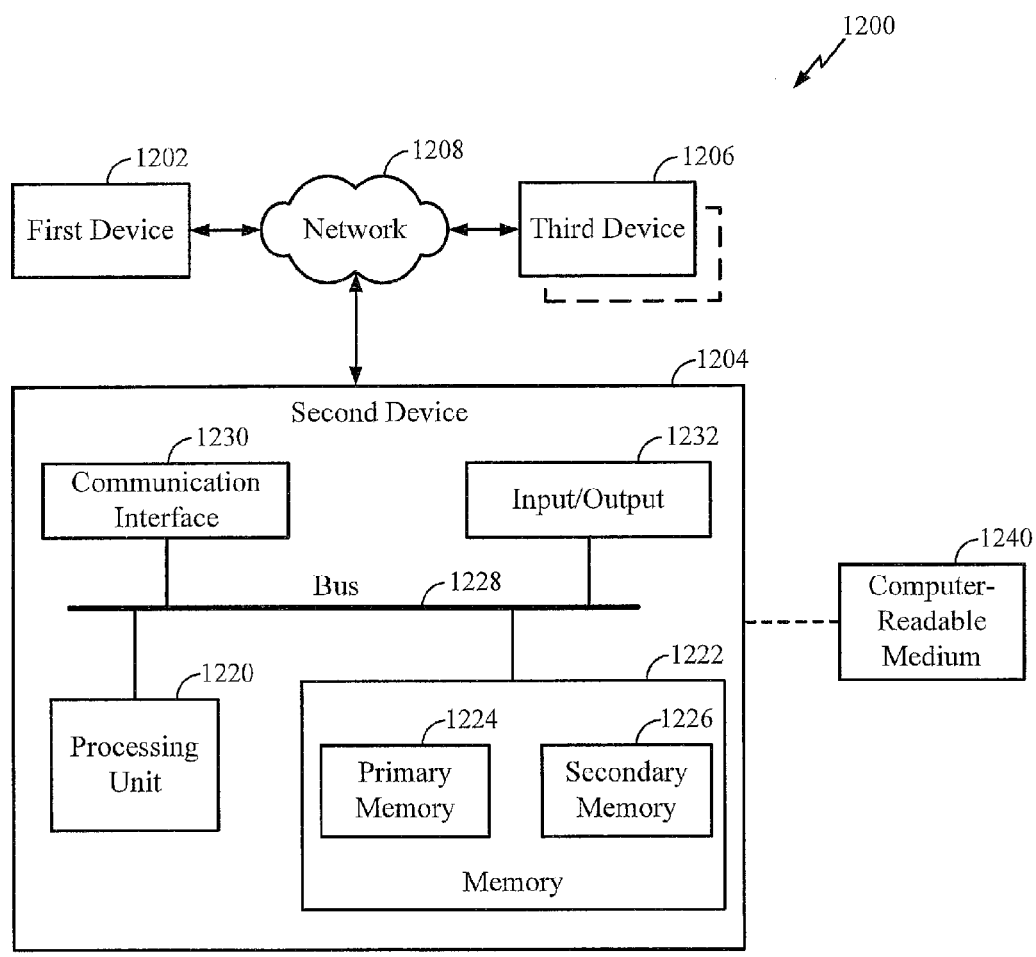
FIG. 12 is a schematic block diagram of an example computing platform in accordance with an implementation.

FIG. 12 is a schematic diagram illustrating an example system 1200 that may include one or more devices configurable to implement techniques or processes described above, for example, in connection with FIG. 1. For example, system 1200 may provide one or more components for location servers 140, 150 and 155 in FIG. 1 and one or more components for a SUPL SLP. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. Second and third devices 1204 and 1206 may comprise mobile devices, in an aspect. Also, in an aspect, wireless communications network 1208 may comprise one or more wireless access points, for example. However, claimed subject matter is not limited in scope in these respects.

First device 1202, second device 1204 and third device 1206, as shown in FIG. 12, may be representative of any device, appliance or machine (e.g., such as base station transceivers 110 or 115, or servers 140, 150 or 155 as shown in FIG. 1) that may be configurable to exchange data over wireless communications network 1208. In one example implementation, first device 1202, second device 1204 or third device 1206 may be configured to operate as an SLP. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208 (e.g., in a particular of implementation of network 130 shown in FIG. 1), may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, a digital map of an indoor area may be stored in a particular format in memory 1222. Processing unit 1220 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("WCDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and WCDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method of position determination for a terminal comprising:
    detecting a handover of the terminal from receiving service through a first wireless access type to receiving service through a second wireless access type while the terminal is in a position determination session with a location server according to a first positioning protocol, wherein the second wireless access type is different from the first wireless access type, wherein the position determination session with the location server according to the first positioning protocol further comprises: determining a positioning measurement, communicating a position estimate to the location server or communicating the positioning measurement to the location server, or any combination thereof; and
    in response to detecting the handover, initiating a transition to application of a second positioning protocol instead of the first positioning protocol, wherein the second positioning protocol is enabled or supported by the second wireless access type.

2. The method of claim 1, wherein the position determination session is resumed or restarted in response to the initiation of the transition to the application of the second positioning protocol.

3. The method of claim 1, wherein the terminal comprise a SUPL enabled terminal (SET) and the location server comprises a SUPL location platform (SLP), and wherein initiating the transition to the application of the second positioning protocol further comprises:

transmitting a SUPL END message to the location server indicating that the first positioning protocol is not enabled or supported by the second wireless access type.

4. The method of claim 1, wherein the terminal comprise a SUPL enabled terminal (SET) and the location server comprises a SUPL location platform (SLP), and wherein initiating the transition to the application of the second positioning protocol further comprises:
transmitting a SUPL REPORT message to the location server indicating at least one of the second wireless access type or capabilities of the terminal while receiving service according to the second wireless access type.

5. The method of claim 1, wherein the terminal comprise a SUPL enabled terminal (SET) and the location server comprises a SUPL location platform (SLP), and wherein initiating the transition to the application of the second positioning protocol further comprises:
transmitting a SUPL POS INIT message to the location server indicating the second wireless access type and capabilities of the terminal while receiving service according to the second wireless access type.

6. The method of claim 1, and further comprising in response to detecting the handover:
attempting to continue positioning under the first positioning protocol; and
terminating open positioning transactions in the position determination session if positioning under the first positioning protocol is not feasible.

7. The method of claim 6, and further comprising transmitting a message to the location server indicating the application of the second positioning protocol without terminating the position determination session.

8. The method of claim 1, and further comprising in response to detecting the handover:
attempting to continue the position determination session with application of the first positioning protocol; and
returning an indication to the location server that the handover to the second wireless access type has occurred for which the first positioning protocol is not enabled or supported.

9. The method of claim 1, wherein the first positioning protocol comprises a positioning protocol selected from one of RRLP, RRC, IS-801 or LLP.

10. The method of claim 1, wherein the second positioning protocol comprises a positioning protocol selected from one of RRLP, RRC, IS-801 or LLP.

11. The method of claim 1, wherein the first wireless access type is selected from one of LTE, cdma2000, HRPD, WCDMA, GSM or WLAN.

12. The method of claim 1, wherein the second wireless access type is selected from one of LTE, cdma2000, HRPD, WCDMA, GSM or WLAN.

13. The method of claim 1, further comprising engaging in a subsequent position determination session with the location server according to the second positioning protocol, the subsequent position determination session to comprise: determination of a subsequent positioning measurement, communication of a subsequent position estimate to the location server or communication of a subsequent positioning measurement to the location server, or any combination thereof.

14. A mobile terminal comprising:
a transceiver to transmit messages to and receive messages from a wireless communication network; and
a processor configured to:
detect a handover of the mobile terminal from receiving service at the transceiver through a first wireless access type to receiving service through a second wireless access type while the mobile terminal is in a position determination session with a location server according to a first positioning protocol, wherein the second wireless access type is different from the first wireless access type, wherein the position determination session with the location server according to the first positioning protocol further comprises: determination of a positioning measurement, communication of a position estimate to the location server or communication of the positioning measurement to the location server, or any combination thereof; and
in response to detection of the handover, initiate a transition to application of a second positioning protocol instead of the first positioning protocol, wherein the second positioning protocol is enabled or supported by the second wireless access type.

15. The mobile terminal of claim 14, wherein the mobile terminal comprises a SUPL enabled terminal (SET) and the location server comprises a SUPL location platform (SLP), and wherein the processor is further configured to initiate the transition to the application of the second positioning protocol by initiating transmission of a SUPL END message through the transceiver to the location server indicating that the first positioning protocol is not enabled or supported by the second wireless access type.

16. The mobile terminal of claim 14, wherein the mobile terminal comprises a SUPL enabled terminal (SET) and the location server comprises a SUPL location platform (SLP), and wherein the processor is further configured to initiate the transition to the application of the second positioning protocol by initiating transmission of a SUPL REPORT message through the transceiver to the location server indicating at least one of the second wireless access type or capabilities of the mobile terminal while receiving service according to the second wireless access type.

17. The mobile terminal of claim 14, wherein the mobile terminal comprises a SUPL enabled terminal (SET) and the location server comprises a SUPL location platform (SLP), and wherein the processor is further configured to initiate the transition to the application of the second positioning protocol by initiating transmission of a SUPL POS INIT message through the transceiver to the location server indicating the second wireless access type and capabilities of the SET while receiving service according to the second wireless access type.

18. The mobile terminal of claim 14, the processor further to engage in a subsequent position determination session with the location server according to the second positioning protocol, the subsequent position determination session to comprise: determination of a subsequent positioning measurement, communication of a subsequent position estimate to the location server or communication of a subsequent positioning measurement to the location sever, or any combination thereof.

19. An article comprising:
a non-transitory storage medium comprising machine-readable instructions stored thereon which are executable by a special purpose computing apparatus at a mobile terminal to:
detect a handover of the mobile terminal from receiving service through a first wireless access type to receiving service through a second wireless access type while the mobile terminal is in a position determination session with a location server according to a first positioning protocol, wherein the second wireless access type is different from the first wireless access type, wherein the position determination session with the location server according to the first positioning protocol further comprises: determination of a positioning measurement, communication of a position estimate to the location server or communication of the positioning measurement to the location server, or any combination thereof; and in response to detection of the handover, initiate a transition to application of a second positioning protocol instead of the first positioning protocol, wherein the second positioning protocol is enabled or supported by the second wireless access type.

20. The article of claim 19, wherein the mobile terminal comprises a SUPL enabled terminal (SET) and the location server comprises a SUPL location platform (SLP), and wherein instructions are further executable by the special purpose computing apparatus to initiate the transition to the application of the second positioning protocol by initiating transmission of a SUPL END message to the location server indicating that the first positioning protocol is not enabled or supported by the second wireless access type.

21. The article of claim 19, wherein the mobile terminal comprises a SUPL enabled terminal (SET) and the location server comprises a SUPL location platform (SLP), and wherein the instructions are further executable by the special purpose computing apparatus to initiate the transition to the application of the second positioning protocol by initiating transmission of a SUPL REPORT message to the location server indicating at least one of the second wireless access type or capabilities of the mobile terminal while receiving service according to the second wireless access type.

22. The article of claim 19, wherein the mobile terminal comprise a SUPL enabled terminal (SET) and the location server comprises a SUPL location platform (SLP), and wherein the instructions are further executable by the special purpose computing apparatus to initiate the transition to the application of the second positioning protocol by initiating transmission of a SUPL POS INIT message to the location server indicating the second wireless access type and capabilities of the SET while receiving service according to the second wireless access type.

23. An apparatus comprising:
means for detecting a handover of a mobile terminal from receiving service through a first wireless access type to receiving service through a second wireless access type while the mobile terminal is in a position determination session with a location server according to a first positioning protocol, wherein the second wireless access type is different from the first wireless access type, wherein the position determination session with the location server according to the first positioning protocol further comprises: determination of a positioning measurement, communication of a position estimate to the location server or communication of the positioning measurement to the location server, or any combination thereof; and means for initiating a transition to application of a second positioning protocol instead of the first positioning protocol in response to detection of the handover, wherein the second positioning protocol is enabled or supported by the second wireless access type.

24. The apparatus of claim 23, wherein the mobile terminal comprises a SUPL enabled terminal (SET) and the location server comprises a SUPL location platform (SLP), and wherein the means for initiating the transition to the application of the second positioning protocol comprises means for initiating transmission of a SUPL END message to the location server indicating that the first positioning protocol is not enabled or supported by the second wireless access type.

25. The apparatus of claim 23, wherein the mobile terminal comprises a SUPL enabled terminal (SET) and the location server comprises a SUPL location platform (SLP), and wherein the means for initiating the transition to the application of the second positioning protocol comprises means for initiating transmission of a SUPL REPORT message to the location server indicating at least one of the second wireless access type or capabilities of the mobile terminal while receiving service according to the second wireless access type.

26. The apparatus of claim 23, wherein the mobile terminal comprises a SUPL enabled terminal (SET) and the location server comprises a SUPL location platform (SLP), and wherein the means for initiating the transition to the application of the second positioning protocol comprises means for initiating transmission of a SUPL POS INIT message to the location server indicating the second wireless access type and capabilities of the SET while receiving service according to the second wireless access type.

* * * * *